(12) United States Patent
Park

(10) Patent No.: US 10,176,685 B2
(45) Date of Patent: Jan. 8, 2019

(54) IMAGE HEAT RAY DEVICE AND INTRUSION DETECTION SYSTEM USING SAME

(71) Applicant: Sang-Rae Park, Seoul (KR)

(72) Inventor: Sang-Rae Park, Seoul (KR)

( * ) Notice: Subject to any disclaimer, the term of this patent is extended or adjusted under 35 U.S.C. 154(b) by 132 days.

(21) Appl. No.: 15/317,357

(22) PCT Filed: Jun. 4, 2015

(86) PCT No.: PCT/KR2015/005601
§ 371 (c)(1),
(2) Date: Dec. 8, 2016

(87) PCT Pub. No.: WO2015/190744
PCT Pub. Date: Dec. 17, 2015

(65) Prior Publication Data
US 2017/0116836 A1    Apr. 27, 2017

(30) Foreign Application Priority Data
Jun. 9, 2014 (KR) .......................... 10-2014-0069490

(51) Int. Cl.
*G08B 13/19* (2006.01)
*G08B 13/196* (2006.01)
(Continued)

(52) U.S. Cl.
CPC ... *G08B 13/19695* (2013.01); *G06K 9/00771* (2013.01); *G08B 13/19* (2013.01); *H04N 5/2256* (2013.01)

(58) Field of Classification Search
CPC ... G08B 13/19; G08B 13/194; G06K 9/00771
See application file for complete search history.

(56) References Cited

U.S. PATENT DOCUMENTS 4,772,875 A * 9/1988 Maddox ................. G06T 9/008
                                                    180/167
4,882,567 A * 11/1989 Johnson ................. G08B 13/19
                                                    340/522
(Continued)

FOREIGN PATENT DOCUMENTS

KR    10-2010-0009690 A    1/2010
KR    10-2010-0107993 A    10/2010
(Continued)

OTHER PUBLICATIONS

European Search Report dated Mar. 9, 2018 in counterpart European Application No. 15806784.3 ( 13 pages in English).
(Continued)

*Primary Examiner* — David E Harvey
(74) *Attorney, Agent, or Firm* — NSIP Law

(57) ABSTRACT

The present invention relates to an intrusion detection system. The intrusion detection system is installed in a surveillance area and may comprise: an image heat ray device for measuring infrared heat generated from an intruder intruding into the surveillance area to determine an intrusion occurrence and generate an alarm signal for indicating the intrusion occurrence, generating a first image and a second image by shooting an image in the surveillance area, generating an intrusion signal including the generated alarm signal, the first image, the second image and a reference image which is an image shot prior to a situation of the intrusion occurrence in the surveillance area, and transmitting the generated intrusion signal to a controller through a frequency for a security system; the controller for receiving the intrusion signal from the image heat ray device and transmitting the received intrusion signal to a server through an Internet network; and the server for receiving the intrusion signal from the controller, transmitting the intrusion signal to the controller and a pre-mapped mobile communication termi- (Continued)

nal, extracting the alarm signal, the reference image, the first image, and the second image from the received intrusion signal, displaying the extracted alarm signal in an alarm signal display area of a display unit installed at the server, and displaying the extracted reference image, first image, and second image, on an image display screen of the display unit.

16 Claims, 6 Drawing Sheets

(51) Int. Cl.
*G06K 9/00* (2006.01)
*H04N 5/225* (2006.01)

(56) References Cited

U.S. PATENT DOCUMENTS

| | | | | |
|---|---|---|---|---|
| 5,202,661 | A * | 4/1993 | Everett, Jr. | G05D 1/0255 340/522 |
| 5,473,368 | A * | 12/1995 | Hart | G08B 13/1963 348/155 |
| 5,641,963 | A * | 6/1997 | Mueller | G08B 13/193 250/342 |
| 5,936,666 | A * | 8/1999 | Davis | G08B 13/19 348/143 |
| 6,265,972 | B1 * | 7/2001 | Lee | G08B 13/193 250/342 |
| 6,415,205 | B1 * | 7/2002 | Myron | G06K 9/00335 340/522 |
| 6,900,729 | B2 * | 5/2005 | Paximadis | G08B 13/19 340/565 |
| 7,102,503 | B2 * | 9/2006 | Kondo | G08B 13/19641 340/506 |
| 7,250,605 | B2 * | 7/2007 | Zhevelev | G01J 5/08 250/353 |
| 7,369,156 | B1 * | 5/2008 | Heinke | G01J 5/02 340/870.07 |
| 8,744,122 | B2 * | 6/2014 | Salgian | G06K 9/00805 382/100 |
| 9,472,067 | B1 * | 10/2016 | Jentoft | G08B 13/00 |
| 9,569,953 | B2 * | 2/2017 | Micko | G01B 11/00 |
| 9,726,544 | B2 * | 8/2017 | Zhevelev | G01J 5/0025 |
| 9,886,620 | B2 * | 2/2018 | Dixon | H04N 7/181 |
| 9,984,559 | B2 * | 5/2018 | Naylor | G08B 29/188 |
| 2004/0212678 | A1 | 10/2004 | Cooper et al. | |
| 2007/0063840 | A1 | 3/2007 | Jentoft | |
| 2008/0151050 | A1 | 6/2008 | Self | |
| 2009/0135252 | A1 | 5/2009 | Matsuda et al. | |
| 2009/0284596 | A1 * | 11/2009 | Lin | H04N 5/2252 348/143 |
| 2011/0119716 | A1 * | 5/2011 | Coleman, Sr. | H04N 7/181 725/62 |
| 2013/0155242 | A1 | 6/2013 | Hevia et al. | |
| 2015/0049941 | A1 * | 2/2015 | Hall | G01J 3/36 382/165 |
| 2016/0203694 | A1 * | 7/2016 | Hogasten | G08B 21/043 348/164 |

FOREIGN PATENT DOCUMENTS

| | | |
|---|---|---|
| KR | 10-1042364 B1 | 6/2011 |
| KR | 10-1354594 B1 | 1/2014 |

OTHER PUBLICATIONS

Partial supplementary European Search Report dated Dec. 4, 2017; in corresponding European Application No. 15806784.3.

* cited by examiner

IMAGE HEAT RAY DEVICE AND INTRUSION DETECTION SYSTEM USING SAME

CROSS REFERENCE TO RELATED APPLICATIONS

This application is the National Phase of PCT/KR2015/005601 filed on Jun. 4, 2015, which claims priority under U.S.C. § 119(a) to Patent Application No. 10-2014-0069490 filed in the Republic of Korea on Jun. 9, 2014, all of which are hereby expressly incorporated by reference into the present application.

TECHNICAL FIELD

Embodiments of the present invention relate to an intrusion detection system, for example, an image passive infrared ray device capable of recognizing that an intruder intrudes into a security area by detecting heat rays and taking and transmitting an image thereof to a server to allow a security manager to recognize occurrence of intrusion and report and respond thereto and an intrusion detection system using the same.

BACKGROUND ART

When people is not always available in an area which needs surveillance against intrusion of outsiders, an intrusion detection system is installed and operated. A general intrusion detection system is provided by installing sensors such as a sound sensor, a door sensor, a shutter sensor, a heat ray sensor, an infrared ray sensor and the like or using a surveillance system using images such as a closed circuit television and the like. The intrusion detection system determines whether an intrusion occurs through sensors and notifies a user and staff of a control center of information such as an alarm and the like when it is determined that the intrusion occurs to allow the user to respond to an intrusion situation.

Meanwhile, a case in which sensors used in the intrusion detection system malfunction, determine an intrusion state, and give a false report to the user and staff of the control center occurs sometimes. For example, in the case of an infrared sensor and a heat ray sensor configured to determine whether an intrusion occurs by sensing infrared heat generated by an intruder, infrared heat generated by not only people but also animals such as rats, cats, dogs and the like is sensed and it is determined as intrusions, thereby giving false reports to users and staff of the control center. Unnecessary consumption of human resources may occur due to the false report.

Accordingly, an intrusion detector capable of precisely sensing whether an intruder intrudes and giving a report on occurrence of intrusion to staff of the control center is necessary. Also, an intrusion system capable of reducing the number of false reports made by an intrusion detector.

DISCLOSURE OF INVENTION

Technical Problem

Embodiments of the present invention provide an image passive infrared ray (IPIR) device capable of increasing reliability with respect to a report on an intrusion situation.

Embodiments of the present invention also provides an intrusion detection system capable of receiving, by a server, report information including an alarm signal which indicates an intrusion situation and images taken at a corresponding area received from the IPIR device and easily determining and responding to, by staff of a control center, whether the corresponding report is a false repot.

Embodiments of the present invention also provides an IPIR device capable of reducing false reports which occur when giving reports on intrusion situations and an intrusion detection system using the same.

Technical Solution

One aspect of the present invention provides an image passive infrared ray (IPIR device) device installed in a surveillance area, including a heat sensing portion including a plurality of heat sensors configured to generate a reference heat sensing value by measuring infrared heat of the surveillance area in a state in which there is no intruder and generate an intruder heat sensing value by measuring infrared heat generated by an intruder when the intruder intrudes, an imaging portion including an illuminance sensor configured to illuminance of the surveillance area, an image sensor configured to generate a reference image by taking an image of the surveillance area in the state in which there is no intruder, generate a first image by taking an image of the surveillance area when the infrared heat generated by the intruder is sensed by any one of the plurality of heat sensors, and generate a second image by taking an image of the surveillance area when the infrared heat generated by the intruder is sensed by another of the plurality of heat sensors, and a light source configured to provide a quantity of light to the image sensor when the image is taken, a communication portion configured to transmit and receive data with an external electronic apparatus through a frequency for a safety system using a wireless communication method, and a controller configured to determine whether an intrusion situation occurs by considering the reference heat sensing value when the intruder heat sensing value is transferred from the heat sensing portion, control to generate an alarm signal which indicates the intrusion situation and generate the reference image, the first image, and the second image when it is determined that the intrusion situation occurs, and generate and transmit an intrusion signal including the alarm signal, the reference image, the first image, and the second image to the external electronic apparatus.

The image sensor may output at least one of the reference image, the first image, and the second image, having monochrome quarter common intermediate formats (QCIFs).

The intrusion signal may include at least one of the reference image, the first image, and the second image, having monochrome QCIFs.

The controller may control light emission of the light source while considering an illuminance value measured by the illuminance sensor.

The light source may be an infrared light emitting diode (IR LED).

The frequencies for the safety system may be frequencies for a wireless base station which do not need a report or permission preset in each country.

The frequencies for the safety system may be frequencies at one of 219 MHz band, 424 MHz, and 447 MHz band.

The controller may control the image sensor to generate the second image within a preset setting time even though the infrared heat generated by the intruder is not sensed by another of the plurality of heat sensors after the first image is generated.

The control portion may control the generated first image to be deleted when the second image is not generated exceeding a preset setting time after the first image is generated.

Another aspect of the present invention provides an intrusion detection system installed in a surveillance area, including an IPIR device configured to determine whether an intrusion occurs by measuring infrared heat generated by an intruder who intrudes into the surveillance area, generate an alarm signal which indicates the occurrence of the intrusion, generate a first image and a second image by taking an image of the surveillance area, generate an intrusion signal including the generated alarm signal, the first image, the second image, and a reference image which is an image taken at the surveillance area before the occurrence of the intrusion, and transmit the intrusion signal to a controller through frequencies for a safety system, the controller configured to receive the intrusion signal from the IPIR device and transmit the received intrusion signal to a server through the Internet, and the server configured to receive the intrusion signal from the controller, transmit the intrusion signal to a mobile communication terminal previously mapped with the controller, extract the alarm signal, the reference image, the first image, and the second image from the received intrusion signal, display the extracted alarm signal in an alarm signal display area of a display portion thereof, and display the reference image, the first image, and the second image which are extracted on an image display screen of the display.

The intrusion signal may include at least one of the reference image, the first image, and the second image, having monochrome QCIFs.

The intrusion signal may include at least one of the reference image, the first image, and the second image with compressed monochrome QCIFs.

The frequencies for the safety system may be frequencies for a wireless base station which do not need a report or permission preset in each country.

The frequencies for the safety system may be frequencies at one of 219 MHz band, 424 MHz, and 447 MHz band.

Another aspect of the present invention provides an intrusion system installed in a surveillance area, including an IRIP device configured to generate a temperature measuring value by measuring infrared heat of the surveillance area, determine whether a fire breaks out from the temperature measuring value, generate a fire outbreak image signal for displaying a surveillance area image generated by taking an image of the surveillance area when it is determined that the fire breaks out as a result of the determination and at least one of a text, an icon, and a figure which indicate the temperature measuring value, and transmit the generated fire outbreak image signal to a controller through frequencies for a safety system, the controller configured to receive the fire outbreak image signal from the IPIR device and transmit the received fire outbreak image signal to a server through the Internet, and the server configured to receive the fire outbreak image signal from the controller, transmit the fire outbreak image signal to a mobile communication terminal previously mapped with the controller, and display the received fire outbreak image signal on a display portion thereof.

The frequencies for the safety system may be frequencies for a wireless base station which do not need a report or permission preset in each country.

The frequencies for the safety system may be frequencies at one of 219 MHz band, 424 MHz, and 447 MHz band.

Advantageous Effects

An image passive infrared ray (IPIR) device according to embodiments of the present invention may check whether an intrusion occurs by sensing infrared heat generated by an intruder and take images of a corresponding area to report, thereby increasing reliability of reporting an intrusion situation.

Also, the images taken at the IPIR device according to embodiments of the present invention when the intrusion situation occurs are monochrome quarter common intermediate format (QCIF) images which are transmitted to a controller through wireless communication and transmitted by the controller to a control center through the Internet, thereby allowing staff of the control center to easily determine whether an intruder intrudes through the received monochrome images.

Also, since the IPIR device and the controller of an intrusion detection system according to embodiments of the present invention transmit and receive data with each other using frequencies for a wireless base station which do not need permission and reports, additional communication bill does not occur. Accordingly, compared with existing intrusion detection systems using exclusive communication networks or a mobile communication network, operation and maintenance costs may be reduced.

BEST MODE FOR INVENTION

Figure 1:
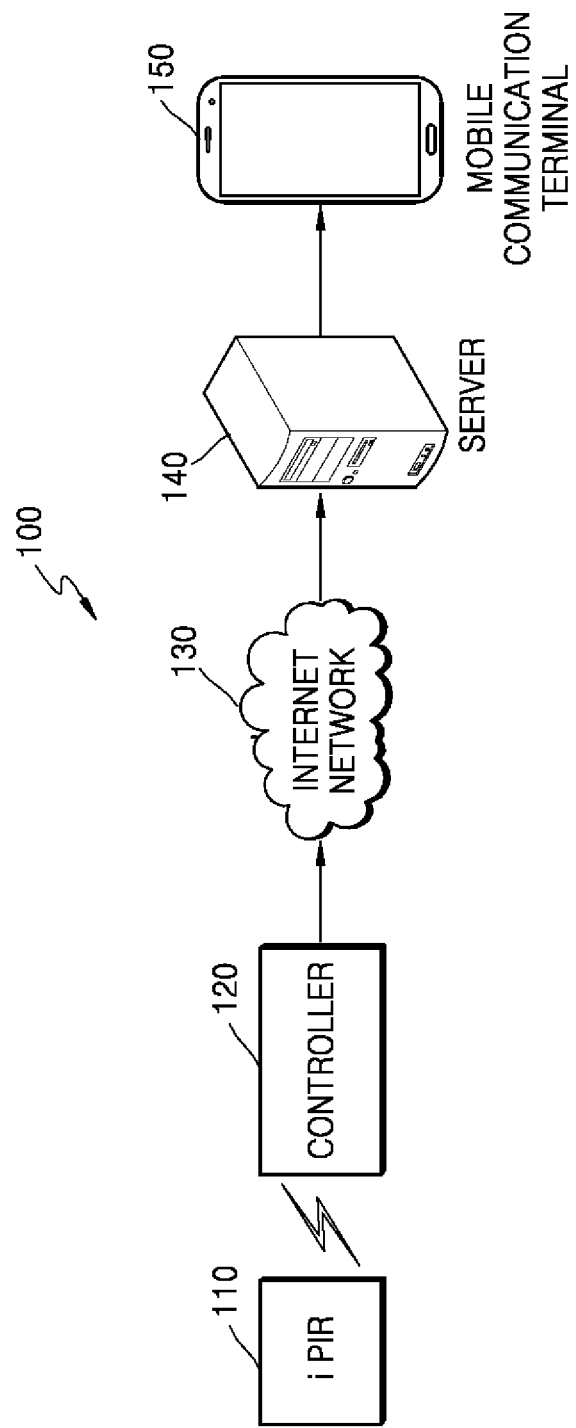
FIG. 1 is a block diagram of an intrusion detection system according to an embodiment of the present invention.

Hereinafter, exemplary embodiments of the present invention will be described in detail with reference to contents illustrated in the attached drawings. However, the present invention is not limited to or defined by the exemplary embodiments. Throughout the drawings, like reference numerals refer to like members which substantially perform the same functions.

The terms including ordinal numbers such as first, second and the like may be used for describing various components, but the components will not be limited by the terms.

The terms are used only for distinguishing one element from others. For example, without departing from the scope of the present invention, a first component may be referred to as a second component, and similarly, the second component may be referred to as the first component. Terms are used herein only to describe particular embodiments but do not intend to limit the present invention. Singular expressions, unless contextually otherwise defined, include plural expressions.

Although terms generally used now are selected for the terms used herein considering functions in the present invention, these may vary according to intentions of one of ordinary skill in the art, practices, the advent of new technology and the like. Also, in particular cases, terms randomly selected by an applicant are present. In this case, meanings thereof will be described in detail in sections of a description of the present invention corresponding thereto. Accordingly, the terms used herein should be defined, not as simple designations of the terms, based on the meanings of the terms and the content throughout the present invention.

Throughout the specification, when it is described that a portion "includes" an element, unless defined otherwise, it means that the portion does not exclude other elements but may further include other elements. Also, the terms "portion", "module", and the like specified herein mean a unit configured to perform at least one function or operation and may be embodied as hardware, software, or a combination of hardware and software.

First, for understanding an image passive infrared ray (IPIR) device and an intrusion detection system using the same according to an embodiment of the present invention, the terms will be described as follows.

A storage portion or a recording medium according to the embodiment of the present invention includes all types of recording media which store a program and data to be read by a computer system. As examples thereof, a read only memory (ROM), a random access memory (RAM), a compact disk (CD), a digital video disk (DVD)-ROM, a magnetic tape, a floppy disk, an optical data storage device, an embedded multimedia card (eMMC) and the like. Also, being embodied as a carrier wave (for example, transmission over the Internet) is included.

A display portion according to the embodiment of the present invention includes an electroluminescent display (ELD), a vacuum fluorescent display (VFD), a light-emitting diode display (LED), a cathode-ray tube (CRT), a liquid crystal display (LCD), a thin film transistor liquid crystal display (TFT LCD), a plasma display panel (PDP), alternate lighting of surfaces (ALiS), a digital light processing (DLP), a liquid crystal on silicon (LCoS), an organic light emitting diode (OLED), a surface-conduction electron-emitter display (SED), a field emission display (FED), a laser TV (quantum dot laser and liquid crystal laser), ferroelectric liquid crystal display (FLD), an interferometric modulator display (iMoD), thick-film dielectric electroluminescent (TDEL), a quantum dot display (QD-LED), a telescopic pixel display (TPD), an organic light emitting transistor (OLET), a laser phosphor display (LPD) and the like.

A surveillance area according to the embodiment is an area which needs monitoring whether an intruder intrudes thereinto.

An IPIR (Image Passive Infrared Ray) device according to the embodiment of the present invention includes a heat sensing portion including a plurality of heat sensors and an imaging portion including an image sensor and a light source element.

The image sensor of the IPIR device according to the embodiment of the present invention may output an image having a monochrome quarter common intermediate format (QCIF) of a taken image.

An alarm signal according to the embodiment of the present invention is a signal generated to allow the IPIR device to determine an intrusion situation through the heat sensing portion and notify the intrusion situation when the intrusion situation occurs.

A reference heat sesning value according to the embodiment of the present invention is a value generated by measuring infrared heat in a surveillance area in a state in which there is no intruder, by the IPIR device using the heat sensing portion.

A intruder heat sensing value according to the embodiment of the present invention is a value generated by measuring infrared heat in a surveillance area in a state in which an intruder intrudes, by the IPIR device using the heat sensing portion. For example, when the intruder heat sensing value is transferred through the heat sensing portion, the IPIR device may determine whether an intruder intrudes, considering a prestored reference heat sensing value.

The heat sensing portion according to the embodiment of the present invention may include the plurality of heat sensors. Each of the heat sensors may provide each heat sensing area. Accordingly, the heat sensing portion may provide a plurality of such heat sensing areas to the IPIR device.

A reference image according to the embodiment of the present invention is an image generated by taking an image of a surveillance area in the state in which there is no intruder, the IPIR device using the imaging portion. For example, the reference image may be generated as a monochrome image.

Images according to the embodiment of the present invention may include a reference taken before occurrence of an intrusion situation and a first image and a second image taken in the intrusion situation when the IPIR device recognizes the intrusion situation through the heat sensing portion.

The first image according to the embodiment of the present invention is an image taken by the image sensor when infrared heat generated by an intruder is firstly sensed by at least one of the plurality of heat sensors included in the heat sensing portion.

The second image according to the embodiment of the present invention is an image taken by the image sensor when infrared heat generated by an intruder is firstly sensed by at least one of the plurality of heat sensors included in the heat sensing portion and then infrared heat is secondarily sensed by another thereof.

An intrusion signal according to the embodiment of the present invention is a signal generated by the IPIR device including the alarm signal notifying the occurrence of the intrusion situation, the reference image, the first image, and the second image.

A controller according to the embodiment of the present invention receives an intrusion signal from at least one IPIR device that recognizes an intrusion situation of an intruder through frequencies for a wireless base station which do not need a report or permission and transmits the received intrusion signal to a server of a control center through the Internet connected in advance.

A mobile communication terminal according to the embodiment of the present invention is a mobile terminal capable of being portable and transmitting and receiving data through mobile communication with the server of the control center and may be a random electronic apparatus including at least one display. The mobile communication terminal described above may be a smart phone, a cellular phone, a wearable head unit, a tablet personal computer, a notebook computer, a personal media player (PMP), personal digital assistants (PDA) and the like. Also, the mobile communication terminal may be a flexible apparatus or a flexible display apparatus.

Frequencies for a safety system according to the embodiment of the present invention may be frequencies for a wireless base station which do not need a preset report or permission in each country. For example, in Korea, the frequencies may be at one of 219 MHz band, 424 MHz band, and 447 MHz band.

Hereinafter, referring to the attached drawings, the IPIR device and the intrusion detection system according to the embodiment of the present invention will be described.

FIG. 1 is a block diagram of the intrusion detection system according to the embodiment of the present invention. Referring to FIG. 1, an intrusion detection system 100 according to the embodiment of the present invention may include at least one IPIR device 110, a controller 120, a server 140, and a mobile communication terminal 150.

The IPIR device 110 may determine whether an intruder intrudes. The IPIR device 110 may determine that an intruder intrudes a surveillance area when infrared heat generated by the intruder is sensed by a heat sensing portion (not shown) included therein. When it is determined that the intruder intrudes, the IPIR device 110 may generate an alarm signal that indicates occurrence of an intrusion situation.

Also, the IPIR device 110 may image corresponding area using an imaging portion (not shown) thereof to generate images. After that, the IPIR device 110 may generate an intrusion signal including the generated alarm signal and the taken images and transmit the generated intrusion signal to the controller 120 using the frequencies for the wireless base station which do not need a report or permission through a communication portion (not shown) included therein.

Also, at least one of such IPIR devices 110 is installed in an area which needs monitoring whether an intrusion occurs and stores identification number information in advance. The identification number information of each IPIR device 110 is unique number information stored in each of a plurality of such IPIR devices 110 and includes a difference number in advance to distinguish one IPIR device 110 from others. The IPIR device 110 may generate an intrusion signal including the identification number information to report an area in which an intrusion situation occurs in detail.

The controller 120 may receive at least one of the IPIR device 110 through a communication portion (not shown) thereof capable of using frequencies for a safety system among frequencies for a wireless base station which do not need a report or permission. The controller 120 may transmit the received intrusion signal to the server 140 of the control center through the communication portion connected to an Internet network 130 to transmit and receive data.

The server 140 of the control center may receive the intrusion signal from the controller 120 through the communication portion connected to the Internet network 130 to transmit and receive data. The server 140 of the control center may extract the images and the alarm signal included in the received intrusion signal and display the extracted images and the alarm signal through a display portion (not shown) to allow staff of the control center to recognize the intrusion situation.

Also, the server 140 of the control center may transmit the received intrusion signal to the mobile communication terminal 150. For example, a storage (not shown) of the server 140 may prestore information the mobile communication terminal 150 mapped with the controller 120 configured to transmit and receive the intrusion signal, in a map table format. The server 140 may extract the information of the mobile communication terminal 150 mapped with the controller 120 configured to transmit the received intrusion signal among the information of the mobile communication terminal 150 prestored in the storage and transmit and receive the intrusion signal received at the extracted mobile communication terminal 150.

The mobile communication terminal 150 may receive the intrusion signal from the server 140, extract and output the alarm signal and taken images from the received intrusion signal through the display to allow a user to recognize whether an intruder intrudes.

The frequencies for the safety system among the frequencies for the wireless base station which do not need a report or permission and are used by the IPIR device 110 and the controller 120 to transmit and receive data may be separate frequencies depending on conditions of each country. For example, in Korea, the frequencies for the safety system, which are frequencies for a base station which do not need a report or permission, may be at one of 219 MHz band, 424 MHz band, and 447 MHz band. In U.S.A., frequencies for public safety may be at VHF/UHF band, 700/800 MHz, 4.9 GHz and the like, frequencies for state/local agencies may be at 97.2 MHz, frequencies for federal agencies may be at 24.45 MHz.

Figure 2:
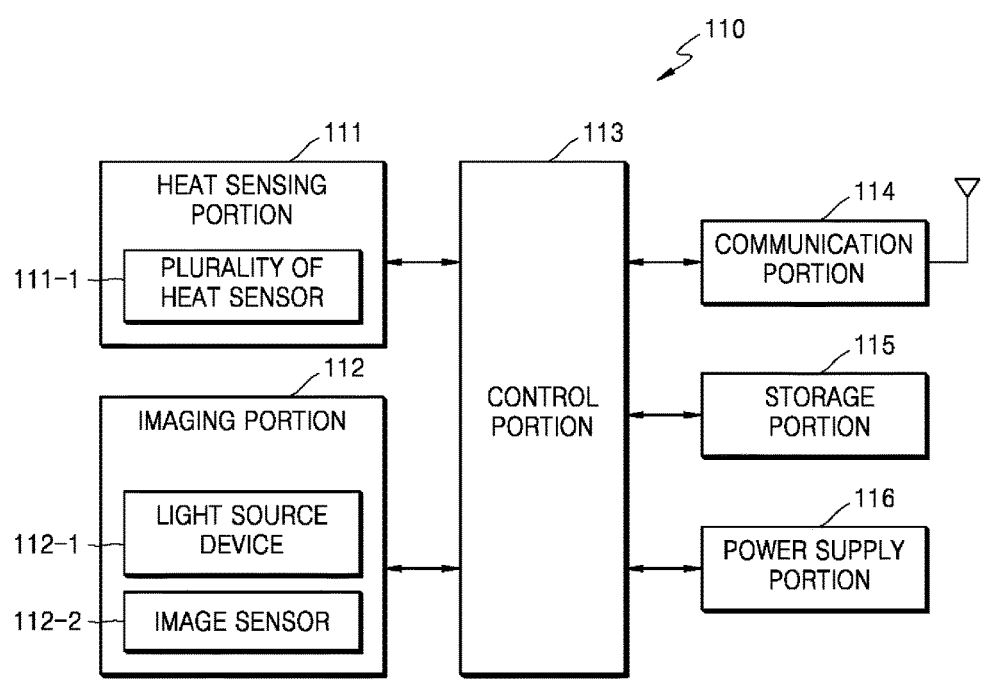
FIG. 2 is a block diagram of an image passive infrared ray (IPIR) device of the intrusion detection system according to the embodiment of the present invention.

FIG. 2 is a block diagram of the IPIR device of the intrusion detection system according to the embodiment of the present invention. Referring to FIG. 2, the IPIR device 110 may include a heat sensing portion 111, an imaging portion 112, a control portion 113, a communication portion 114, a storage portion 115, and a power supply portion 116.

The heat sensing portion 111 may include a plurality of heat sensors 111-1.

Each of the plurality of heat sensors 111-1 may provide a heat sensing area. The heat sensing portion 111 may provide a plurality of such heat sensing areas to the IPIR device 110 through the plurality of heat sensors 111-1. For example, when an intruder enters at least one of the plurality of heat sensing areas, the heat sensor which provides a corresponding heat sensing area may sense infrared heat generated by the intruder and generate an intruder heat sensing value. The heat sensing portion 111 may transfer the intruder heat sensing value generated by one of the plurality of heat sensors 111-1 to the control portion 113.

Also, the heat sensing portion 111 may generate a reference heat sensing value by sensing infrared heat of a surveillance area before occurrence of an intrusion situation through the plurality of heat sensors 111-1 under the control of the control portion 113. The heat sensing portion 111 may transfer the generated reference heat sensing value to the control portion 113. The control portion 113 may store the transferred reference heat sensing value in the storage portion 115. The reference heat sensing value indicates a value of the measured infrared heat of the surveillance area in which an intrusion situation does not occur.

Also, the heat sensing portion 111 may perform a heat sensing operation by considering the reference heat sensing value under the control of the control portion 113. When an intruder enters the heat sensing area, the heat sensing portion 111 may generate an intruder heat sensing value which indicates a value of measuring infrared heat generated by the intruder and then transfer the generated heat sensing value to the control portion 113.

The imaging portion 112 may include a light source 112-1 and an image sensor 112-2.

The light source 112-1 may emit light under the control of the control portion 113. The light source 112-1 may provide a quantity of light of the image sensor 112-2 when an image is taken at night. For example, the light source 112-1 may include an infrared light emitting diode (IR LED).

The image sensor 112-2 may take an image of the surveillance area under the control of the control portion 113. The image sensor 11 may transfer the taken image having a monochrome QCIF to the control portion 113.

Also, the image sensor 112-2 may generate a reference image of a monochrome image by taking an image of the surveillance area in a state before occurrence of an intrusion situation under the control of the control portion 113. The image sensor 112-2 may transfer the generated reference image to the control portion 113. The control portion 113 may store the transferred reference heat sensing value in the storage portion 115. The reference image refers to an image taken with respect to the surveillance area before the occurrence of the intrusion situation.

Also, when an intruder enters any one of the plurality of heat sensing areas, the image sensor 112-2 may generate a first image by taking an image of the corresponding surveillance area under the control of the control portion 113. The image sensor 112-2 may transfer the generated first image to the control portion 113. The control portion 113 may store the transferred first image in the storage portion 115.

Figure 3A:
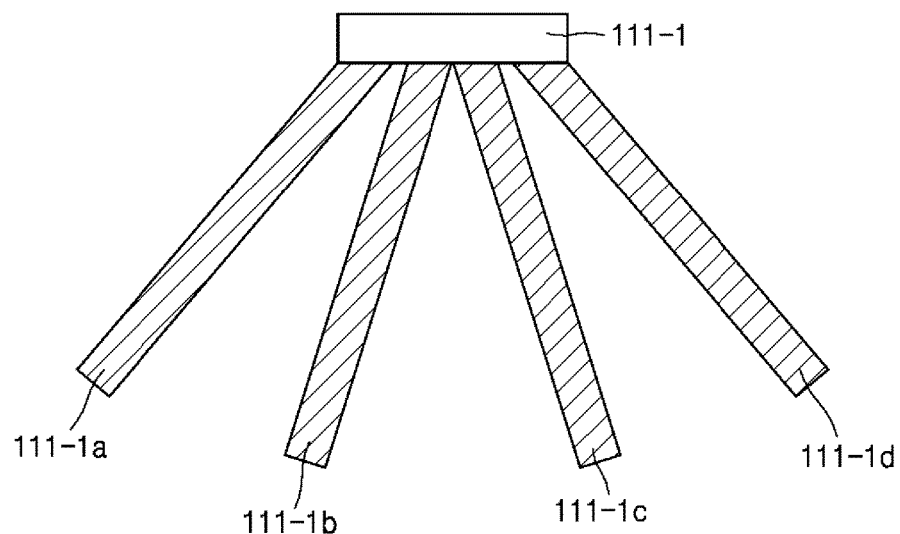
FIG. 3 is a view illustrating an example of a method of detecting an intruder by the IPIR device according to the embodiment of the present invention.

Also, when an intruder enters another area after entering the one of the plurality of heat sensing areas, the image sensor 112-2 may generate a second image by taking an image of the corresponding surveillance area under the control of the control portion 113. The image sensor 112-2 may transfer the generated second image to the control portion 113. The control portion 113 may store the transferred second image in the storage portion 115. For example, FIG. 3 is a view illustrating an example of a method of detecting an intruder by the IPIR device according to the embodiment of the present invention. Referring to FIG. 3(a), the heat sensing portion 111 may include the plurality of heat sensors 111-1. The plurality of heat sensors 111-1 may include a first sensing area 111-1a, a second sensing area 111-1b, a third sensing area 111-1c, and a fourth sensing area 111-1d.

Figure 3B:
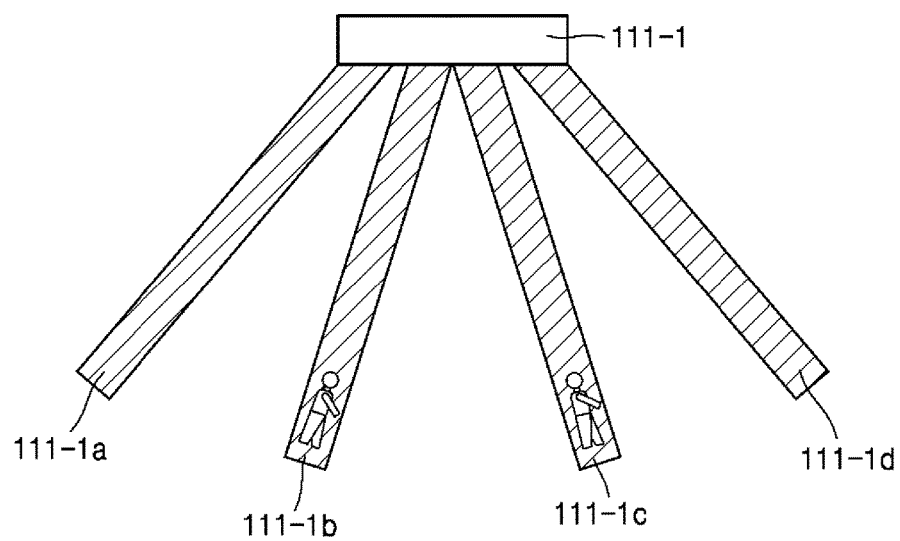

Referring to FIG. 3(b), when it is sensed by infrared heat detection that an intruder intrudes into the second sensing area 111-1b which is any one the plurality of sensing areas 111-1a, 111-1b, 111-1c, and 111-1d, the image sensor 112-2 may generate a first image by taking an image of the corresponding surveillance area under the control of the control portion 113. After that, when the intruder enters the second sensing area 111-1c which is another surveillance area, the image sensor 112-2 may generate the second image by taking an image of the corresponding surveillance area under the control of the control portion 113.

Also, the imaging portion 112 may further include an illuminance sensor (not shown). The illuminance sensor (not shown) may generate an illuminance value by measuring illuminance of the surveillance area under the control of the control portion 113 and transfer the generate illuminance value to the control portion 113. The control portion 113 may determine a state of the surveillance area to be daytime or nighttime by considering the transferred illuminance value and determine whether to control the light source 112-1 when the imaging portion 112 takes an image.

The control portion 113 may determine whether an intruder intrudes by monitoring a change in infrared heat of the surveillance area using the heat sensing portion 111. When it is determined whether the intruder intrudes, it is possible to increase the accuracy of determining whether the intruder intrudes by considering the reference heat sensing value stored in the storage portion 115.

Also, when an intruder is sensed at any one of the plurality of heat sensing areas of the heat sensing portion 111, the control portion 113 may control the imaging portion 112 to take an image of the corresponding surveillance area to generate a first image.

After that, when the intruder is sensed at another of the plurality of heat sensing areas of the heat sensing portion 111, the control portion 113 may control the imaging portion 112 to take an image of the corresponding surveillance area to generate a second image.

Also, when infrared heat of the intruder is sensed at any one of the plurality of heat sensing areas of the heat sensing portion 111, even though the infrared heat of he intruder is not sensed at any another of the plurality of heat sensing areas of the heat sensing portion 111 after receiving the first image generated by the imaging portion 112, the second image of the corresponding surveillance area may be generated by the imaging portion 112 and transferred within a preset setting time. The setting time may be preset according to a setting time transferred from a manufacturer of the IPIR device 110, the user and the server 140 through the controller 120.

Also, when the second image is not generated through the imaging portion 112 exceeding the preset setting time after the first image is generated, the control portion 113 may recognize that the heat sensing portion 111 malfunctions and delete the first image generated by the imaging portion 112 and transferred, from the storage portion 115. The setting time may be preset according to a setting time transferred from the manufacturer of the IPIR device 110, the user and the server 140 through the controller 120.

also, the control portion 113 may generate an intrusion signal which indicates that an intrusion situation occurs and transmit the generated intrusion signal to the controller 120 using the frequencies for the safety system through the communication portion 114. The intrusion signal may include an alarm signal and images which indicate that the intrusion situation occurs. The images may include the reference image prestored in the storage portion 115 and the first image and the second image transferred from the imaging portion 112.

The communication portion 114 may transmit and receive data with an external electronic device through a wireless communication method under the control of the control portion 113. For example, the communication portion 114 may transmit data using the frequencies for the safety system to the controller 120 positioned outside the IPIR device 110 under the control of the control portion 113.

The storage portion 115 may store various types of data necessary for an operation of the IPIR device 110 and data transmitted and received through the communication portion 114 under the control of the control portion 113. For example, the storage portion 115 may store the reference heat sensing value, the reference image, the first image, the second image and the like under the control of the control portion 113.

The power supply portion 116 may supply power to one or a plurality of batteries (not shown) disposed in a housing of the IPIR device 110 under the control of the control portion 113. The one or the plurality of batteries supply power to the IPIR device 110.

Also, the power supply portion 116 may supply power input from an external power source (not shown) to the IPIR device 110 through a cable connected to an input/output terminal (not shown).

Also, the power supply portion 116 of the IPIR device 110 may supply power wirelessly input from the external power source to the IPIR device 110 using a wireless charging technology.

The IPIR device 110 may convert the reference image, the first image, and the second image, having the monochrome QCIF, into a compressed state and generate an intrusion signal including the images in the compressed state.

Meanwhile, the components of the IPIR device 110 are separately shown in the drawings to indicate that they may be functionally and logically separated but not mean that the components are sure to be physically separate components or embodied as separate codes.

Figure 4:
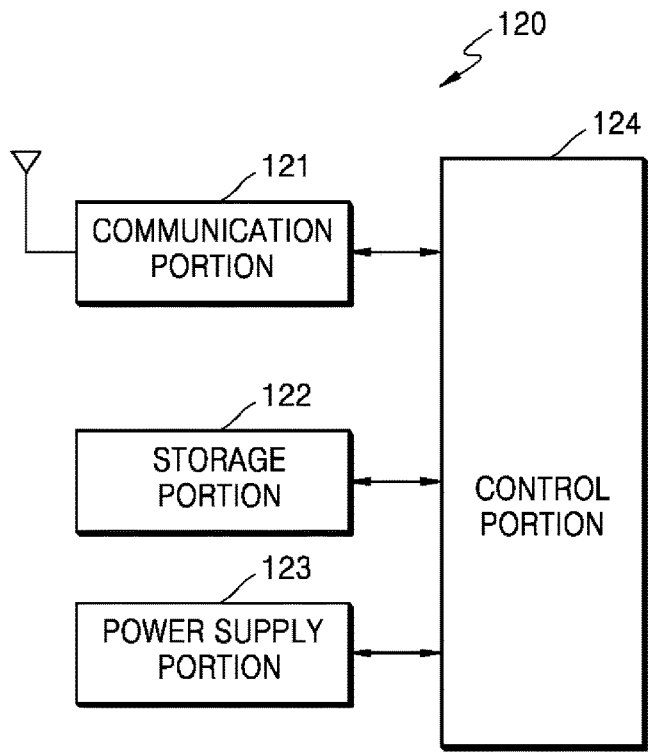
FIG. 4 is a block diagram of a controller of the intrusion detection system according to the embodiment of the present invention.

FIG. 4 is a block diagram of the controller of the intrusion detection system according to the embodiment of the present invention. Referring to FIG. 4, the controller 120 may include a communication portion 121, a storage portion 122, a power supply portion 123, and a control portion 124.

The communication portion 121 may receive an intrusion signal from the communication portion 114 of the IPIR device 110 under the control of the control portion 124. The communication portion 121 of the controller 120 and the communication portion 114 of the IPIR device 110 may transmit and receive data using the frequencies for the safety system. For example, the communication portion 121 may transmit and receive data with the communication portion 114 of the IPIR device 110 using the frequencies for the safety system. The frequencies for the safety system, which are frequencies for a base station which do not need a report or permission, may be at one of 219 MHz band, 424 MHz band, and 447 MHz band in Korea.

Also, the communication portion 121 may transmit and receive data with the server 140 through the Internet network 130 under the control of the control portion 124. For example, the communication portion 121 may include a wired or wireless local area network (LAN) communication portion (not shown) configured to provide communication specification of 802.11.XX of IEEE (Institute of Electrical and Electronics Engineers. The communication portion 121 may transmit and receive data with the server 140 through wired or wireless communication using the connected Internet.

The storage portion 122 may store various types of data necessary for an operation of the controller 120 and data transmitted and received through the communication portion 121 under the control of the control portion 124. For example, the storage portion 122 may store an intrusion signal received from the IPIR device 110 under the control of the control portion 124.

The power supply portion 123 may supply power to one or a plurality of batteries (not shown) disposed in a housing of the controller 120 under the control of the control portion 124. The one or the plurality of batteries supply power to the controller 120.

Also, the power supply portion 123 may supply power input from an external power source (not shown) to the controller 120 through a cable connected to an input/output terminal (not shown).

The control portion 124 may receive an intrusion signal from the IPIR device 110 through the communication portion 121. The control portion 124 may transmit the received intrusion signal to the server 140 through the Internet network 130 connected to the communication portion 121.

Also, the control portion 124 may store the received intrusion signal in the storage portion 122.

Figure 5:
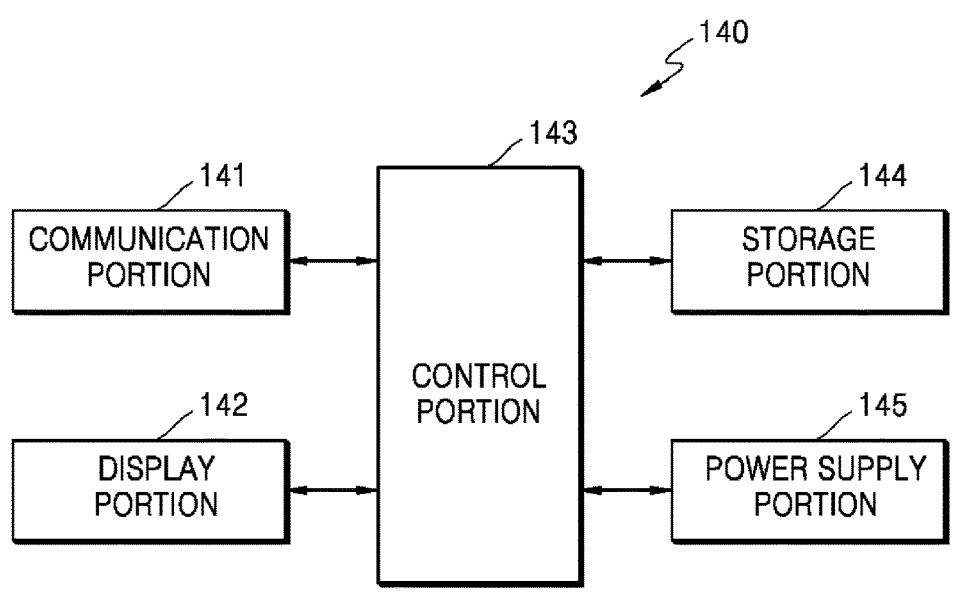
FIG. 5 is a block diagram of a server of the intrusion detection system according to the embodiment of the present invention.

FIG. 5 is a block diagram of the server of the intrusion detection system according to the embodiment of the present invention. Referring to FIG. 5, the server 140 may include a communication portion 141, a display portion 142, a control portion 143, a storage portion 144, and a power supply portion 145.

The communication portion 141 may include a wired or wireless LAN communication portion (not shown) configured to provide communication specification of 802.11.XXX of IEEE. The communication portion 141 may transmit and receive data with the controller 120 through wired or wireless communication using the connected Internet. For example, the communication portion 141 may receive an intrusion signal from the controller 120 under the control of the control portion 143.

The storage portion 144 may store various types of data necessary for an operation of the server 140 and data transmitted and received through the communication portion 141 under the control of the control portion 143. For example, the storage portion 144 may store an intrusion signal from the controller 120 under the control of the control portion 143.

Also, when a plurality of intrusion signals are received from a plurality of such controllers 120 through the communication portion 141, the storage portion 144 may sequentially the intrusion signals depending on receiving times under the control of the control portion 143.

The power supply portion 145 may supply power input from an external power source (not shown) to the server 140 through a cable connected to an input/output terminal (not shown).

Also, the power supply portion 145 may charge one or a plurality of charging batteries (not shown) disposed in a housing of the server 140 by supplying power thereto under the control of the control portion 143. The one or the plurality of charging batteries may supply power to the server 140 when power is not supplied from the external power source.

The control portion 143 may receive an intrusion signal from the controller 120 through the communication portion 141. The control portion 143 may store the received intrusion signal in the storage portion 144.

Also, the control portion 143 may extract an alarm signal and images from the received intrusion signal. The control portion 143 may display at least one of a test, a figure, and an icon through an alarm signal display area (not shown) of the display portion 142 to allow staff of the control center to recognize the extracted alarm signal. For example, the control portion 143 may display at least one of a text, a figure, and an icon each of which indicates the alarm signal in the alarm signal display area provided on the display portion 142.

Also, the control portion 143 may display an image-check area (not shown) for converting a screen of the display portion 142 into an image display screen for checking the extracted images as at least one of a text, a figure, and an icon on the display portion 142. For example, the control portion 143 may display an image-check sign (not shown) as at least one of a text, a figure, and an icon in the image-check area provided on the display portion 142. When the image-check sign is selected by a user input, the control portion 143 may display the extracted images through the image display screen to allow staff of the control center to check whether an intruder intrudes by checking the images. The displayed images may include the reference image, the first image, and the second image.

Also, the server 140 may include an input portion (not shown) to receive a user input signal. For example, when a user input signal for selecting the image-check sign displayed on the display portion 142 is received, the control portion 143 may display the corresponding images as a full screen through the display portion 142.

Figure 6A:
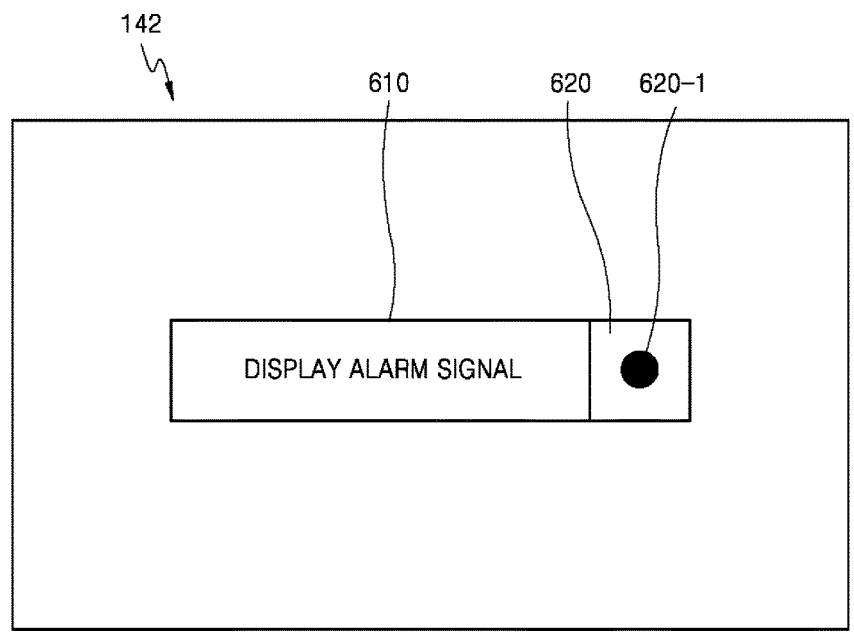
FIG. 6 is a view illustrating an example of a displaying method of a display portion of the server according to the embodiment of the present invention.
Figure 6B:
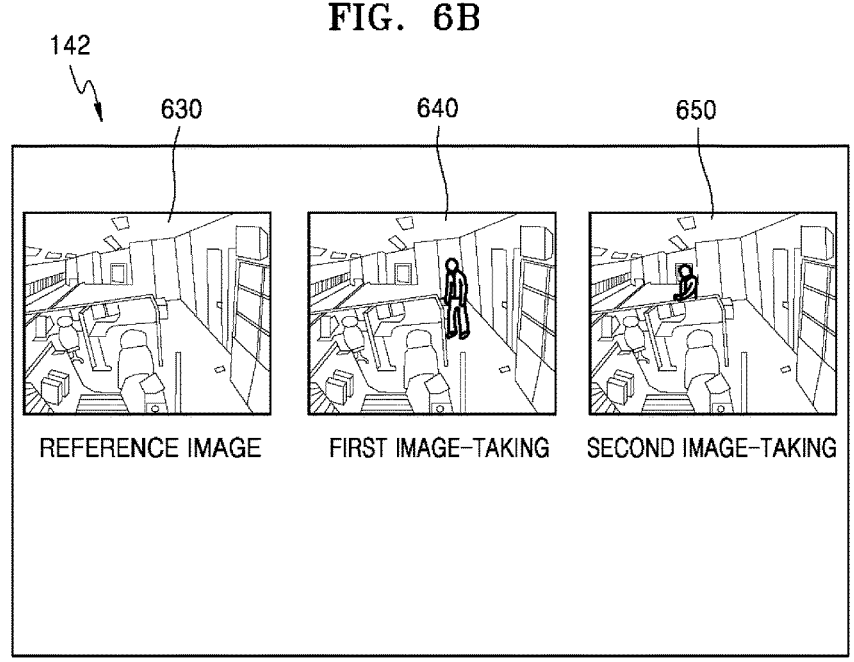

FIG. 6 is a view illustrating an example of a displaying method of the display portion of the server according to the embodiment of the present invention. Referring to FIG. 6(*a*), the display portion 142 may display an alarm signal display area 610 and an image-check area 620.

The control portion 143 of the server 140 may display an alarm signal included in a received intrusion signal as at least one of a text, a figure, and an icon on the alarm signal display area 610 to allow staff of the control center to recognize an intrusion situation of an intruder.

Also, when images are received with the alarm signal, the control portion 143 of the server 140 may display an image-check sign 620-1 as a text, a figure, and an icon in the image-check area 620.

Also, the image-check area 620 may be formed close to the alarm signal display area 610.

Also, the image-check sign 620-1 of the image-check area 620 may not be displayed when images are not included in the intrusion signal.

Referring to FIG. 6(*b*), when the image-check sign 620-1 is selected, the control portion 143 of the server 140 may convert and display a reference image 630, a first image 640, and a second image 650 received with a corresponding alarm signal into a full screen to allow staff of the control center to recognize an intrusion situation of an intruder by checking the images.

Figure 7A:
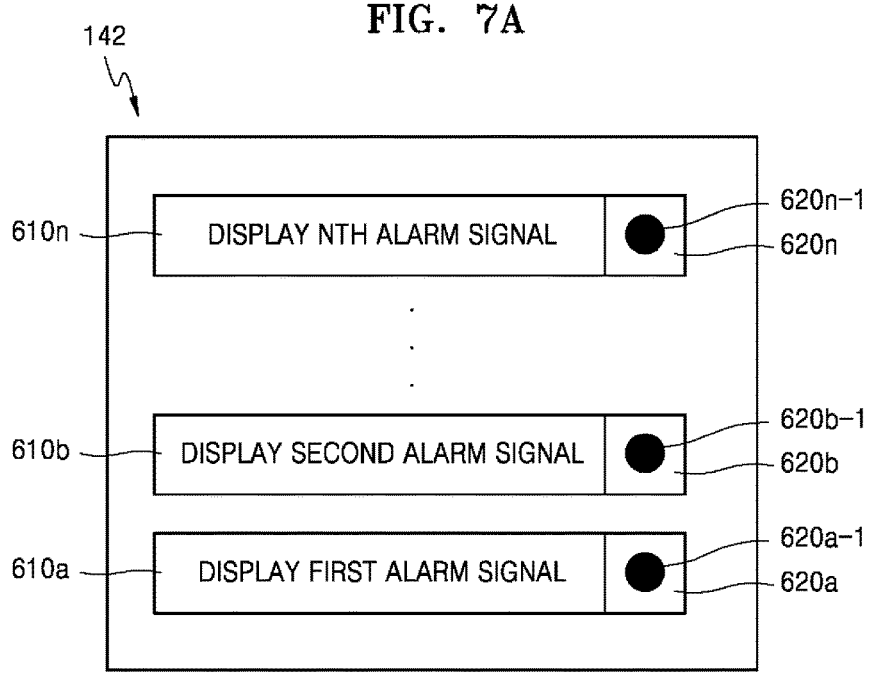
FIG. 7 is a view illustrating another example of the displaying method of the display portion of the server according to the embodiment of the present invention.
Figure 7B:
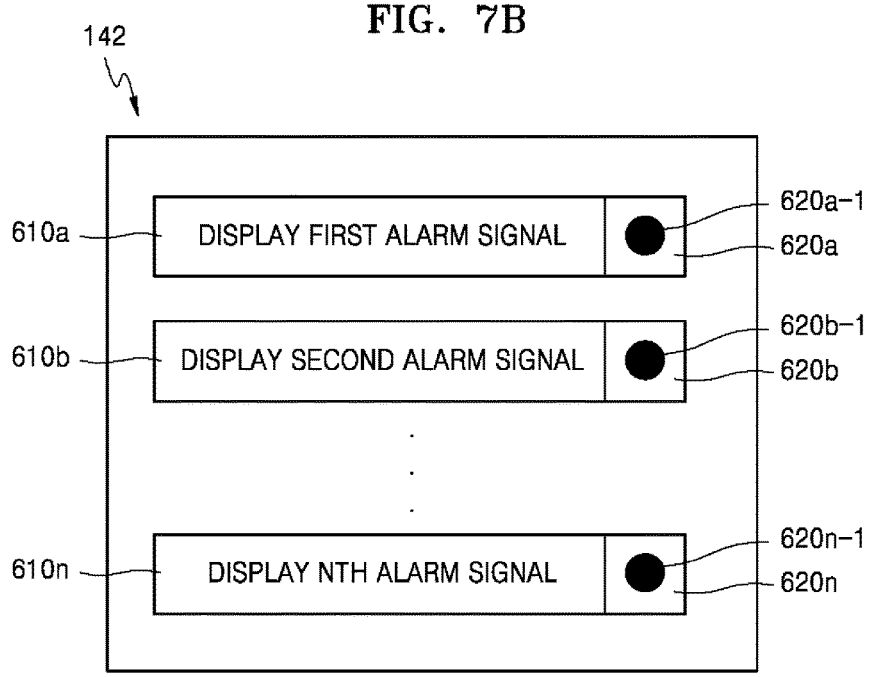

FIG. 7 is a view illustrating another example of the displaying method of the display portion of the server according to the embodiment of the present invention. Referring to FIG. 7(*a*), when a plurality of intrusion signals are received, the control portion 143 of the server 140 may display the plurality of intrusion signals in receiving order using a descending order from a top end to a bottom end of the display portion 142. For example, at the bottom end of the display portion 142, an alarm signal included in a firstly received intrusion signal may be displayed in a first alarm signal display area 610*a* and a first image-check sign 620*a*-1 for checking images received together may be displayed in a first image-check area 620*a*.

At the top end of the display portion 142, an alarm signal included in an nth-received intrusion signal may be displayed in an nth alarm signal display area 610*n* and an nth image-check sign 620*n*-1 for checking images received together may be displayed in an nth image-check area 620*n*.

Referring to FIG. 7(*b*), when a plurality of intrusion signals are received, the control portion 143 of the server 140 may display the plurality of intrusion signals in receiving order using an ascending order from the top end to the bottom end of the display portion 142. For example, at the top end of the display portion 142, an alarm signal included in a firstly received intrusion signal may be displayed in a first alarm signal display area 610*a* and a first image-check sign 620*a*-1 for checking images received together may be displayed in a first image-check area 620*a*. At the bottom end of the display portion 142, an alarm signal included in an nth-received intrusion signal may be displayed in an nth alarm signal display area 610*n* and an nth image-check sign 620*n*-1 for checking images received together may be displayed in an nth image-check area 620*n*.

Meanwhile, the intrusion detection system 100 may operate for fire-watching of the surveillance area as follows.

The IPIR device 110 may generate a temperature measuring value by measuring infrared heat of the surveillance area. The IPIR device 110 may determine whether a fire breaks out in the surveillance area using the measured temperature measuring value. For example, the IPIR device 110 may determine whether the fire breaks out by comparing the temperature measuring value measured at the surveillance area with a previous temperature measuring value measured in advance and stored or a preset reference measuring temperature value. As a result of the determination described above, when a fire breaks out, the IPIR device 110 may take an image of the surveillance area in which the fire breaks out and generate a surveillance area image.

After that, the IPIR device 110 may generate a fire outbreak image signal from the generated surveillance area image and the temperature measuring value. The fire outbreak image signal may be a signal generated to display the surveillance area image including at least one of a text, an icon, and a figure which indicates a temperature measuring value obtained by measuring the surveillance area in which a fire breaks out. The IPIR device 110 may transmit the generated fire outbreak image signal to the controller 120 using the frequencies for the safety system.

The controller 120 may receive the fire outbreak image signal from the IPIR device 110 using the frequencies for the safety system. The controller 120 may transmit the received fire outbreak image signal to the server 140 through the Internet. The frequencies for the safety system may be frequencies for a wireless base station which do not a report or permission preset in each country. For example, the frequencies may be at one of 219 MHz band, 424 MHz band, and 447 MHz band.

The server 140 may receive the fire outbreak image signal from the controller 120. The server 140 may transmit the fire outbreak image signal to a mobile communication terminal previously mapped with the controller 120 and display the received fire outbreak image signal through the display portion 142 thereof. The user may recognize a degree of a fire situation through at least one of a text, an icon, and a figure which indicate the temperature measuring value included in an image of the surveillance area in which the fire breaks out and displayed therewith through the fire outbreak image displayed on the display portion 142 to respond thereto.

Meanwhile, the components of the intrusion detection system 100 are separately shown in the drawings to indicate that they may be functionally and logically separated but not mean that the components are sure to be physically separate components or embodied as separate codes.

Also, throughout the specification, each functional portion may mean functional and structural combination between hardware for performing the technical concept of the present invention and software for driving the hardware. For example, one of ordinary skill in the art may easily perceive that the each functional portion may refer to a certain code and a logical unit of a hardware resource for executing the certain code but does not mean a code sure to be physically connected or one type of hardware.

As described above, particular features such as detailed components and the like and limited embodiments of the present invention have been described with reference to the drawings to provide more general understandings of the present invention. However, the present invention is not limited the above embodiments and may be variously changed and modified by one of ordinary skill in the art from the above description.

Accordingly, the concept of the present invention should not be limited to the embodiments described above and the scope of the present invention should be defined by the following claims and include equivalents thereof.

INDUSTRIAL APPLICABILITY

The present invention may be generally applied to the field of intrusion detection systems.

The invention claimed is:

1. An image passive infrared ray (IPIR) device installed in a surveillance area, comprising:
a heat sensing portion comprising a plurality of heat sensors configured to:
generate a reference heat sensing value by measuring infrared heat of the surveillance area in a state in which there is no intruder, and
generate an intruder heat sensing value by measuring infrared heat generated by an intruder when the intruder intrudes;
an imaging portion comprising:
an illuminance sensor configured to measure an illuminance of the surveillance area,
an image sensor configured to generate a reference image by taking an image of the surveillance area in the state in which there is no intruder, generate a first image by taking an image of the surveillance area in response to the infrared heat generated by the intruder being sensed by any one of the plurality of heat sensors, and generate a second image by taking an image of the surveillance area in response to the infrared heat generated by the intruder being sensed by another of the plurality of heat sensors, and
a light source configured to provide a quantity of light to the image sensor in response to the image being taken;
a communication portion configured to transmit and receive data with an external electronic apparatus through frequencies for a safety system using a wireless communication method; and
a controller configured to:
determine whether an intrusion situation occurs by considering the reference heat sensing value when the intruder heat sensing value is transferred from the heat sensing portion,
generate an alarm signal which indicates the intrusion situation and control the image sensor to generate the reference image, the first image, and the second image when it is determined that the intrusion situation occurs, and
generate and transmit an intrusion signal including the alarm signal, the reference image, the first image, and the second image to the external electronic apparatus,
wherein the controller controls the generated first image to be deleted in response to the second image being not generated beyond a preset setting time after the first image is generated.

2. The IPIR device of claim 1, wherein the image sensor outputs at least one of the reference image, the first image, and the second image, each image having monochrome quarter common intermediate formats (QCIFs).

3. The IPIR device of claim 2, wherein the intrusion signal comprises at least one of the reference image, the first image, and the second image, each image having monochrome QCIFs.

4. The IPIR device of claim 1, wherein the controller controls light emission of the light source while considering an illuminance value measured by the illuminance sensor.

5. The IPIR device of claim 1, wherein the light source is an infrared light emitting diode (IR LED).

6. The IPIR device of claim 1, wherein the frequencies for the safety system are frequencies for a wireless base station which do not require pre-set notification or permission in each country where the IPIR device is installed.

7. The IPIR device of claim 1, wherein the frequencies for the safety system are frequencies at one of 219 MHz band, 424 MHz band, and 447 MHz band.

8. The IPIR device of claim 1, wherein the controller controls the image sensor to generate the second image within the preset setting time even though the infrared heat generated by the intruder is not sensed by another of the plurality of heat sensors after the first image is generated.

9. An intrusion detection system installed in a surveillance area, comprising:
an image passive infrared ray (IPIR) device comprising a first controller configured to:
determine whether an intrusion occurs by measuring an infrared heat generated by an intruder who intrudes into the surveillance area,
generate an alarm signal which indicates the occurrence of the intrusion,
generate a first image and a second image by taking an image of the surveillance area,
generate an intrusion signal including the generated alarm signal, the first image, the second image, and a reference image which is an image taken at the surveillance area before the occurrence of the intrusion, and
transmit the intrusion signal to a second controller through frequencies for a safety system;
the second controller configured to receive the intrusion signal from the IPIR device and transmit the received intrusion signal to a server through an Internet; and
the server configured to:
receive the intrusion signal from the second controller,
transmit the intrusion signal to a mobile communication terminal previously mapped with the second controller,
extract the alarm signal, the reference image, the first image, and the second image from the received intrusion signal,
display the extracted alarm signal in an alarm signal display area of a display portion thereof, and
display the reference image, the first image, and the second image which are extracted on an image display screen of the display.

10. The IPIR device of claim 9, wherein the intrusion signal comprises at least one of the reference image, the first image, and the second image, each image having monochrome QCIFs.

11. The IPIR device of claim 10, wherein the intrusion signal comprises at least one of the reference image, the first image, and the second image with compressed monochrome QCIFs.

12. The IPIR device of claim 9, wherein the frequencies for the safety system are frequencies for a wireless base station which do not require pre-set notification or permission in each country where the IPIR device is installed.

13. The IPIR device of claim 9, wherein the frequencies for the safety system are frequencies at one of 219 MHz band, 424 MHz band, and 447 MHz band.

14. An intrusion system installed in a surveillance area, comprising:
an image passive infrared ray (IPIR) device including heat sensors configured to generate a temperature measuring value by measuring an infrared heat of the surveillance area, and a first controller configured to:
determine whether a fire breaks out from the temperature measuring value,
generate a fire outbreak image signal for displaying a surveillance area image generated by taking an image of the surveillance area when it is determined that the fire breaks out as a result of the determination and at least one of a text, an icon, and a figure which indicate the temperature measuring value, and
transmit the generated fire outbreak image signal to a second controller through frequencies for a safety system;
the second controller configured to:
receive the fire outbreak image signal from the IPIR device, and
transmit the received fire outbreak image signal to a server through an Internet; and
the server configured to:
receive the fire outbreak image signal from the second controller,
transmit the fire outbreak image signal to a mobile communication terminal previously mapped with the second controller, and
display the received fire outbreak image signal on a display portion thereof.

15. The IPIR device of claim 14, wherein the frequencies for the safety system are frequencies for a wireless base station which do not require pre-set notification or permission in each country where the IPIR device is installed.

16. The IPIR device of claim 14, wherein the frequencies for the safety system are frequencies at one of 219 MHz band, 424 MHz band, and 447 MHz band.

* * * * *